Jan. 23, 1923.
C. YORK.
CUTTING DEVICE FOR PNEUMATIC TIRES.
FILED APR. 27, 1921.
1,443,303
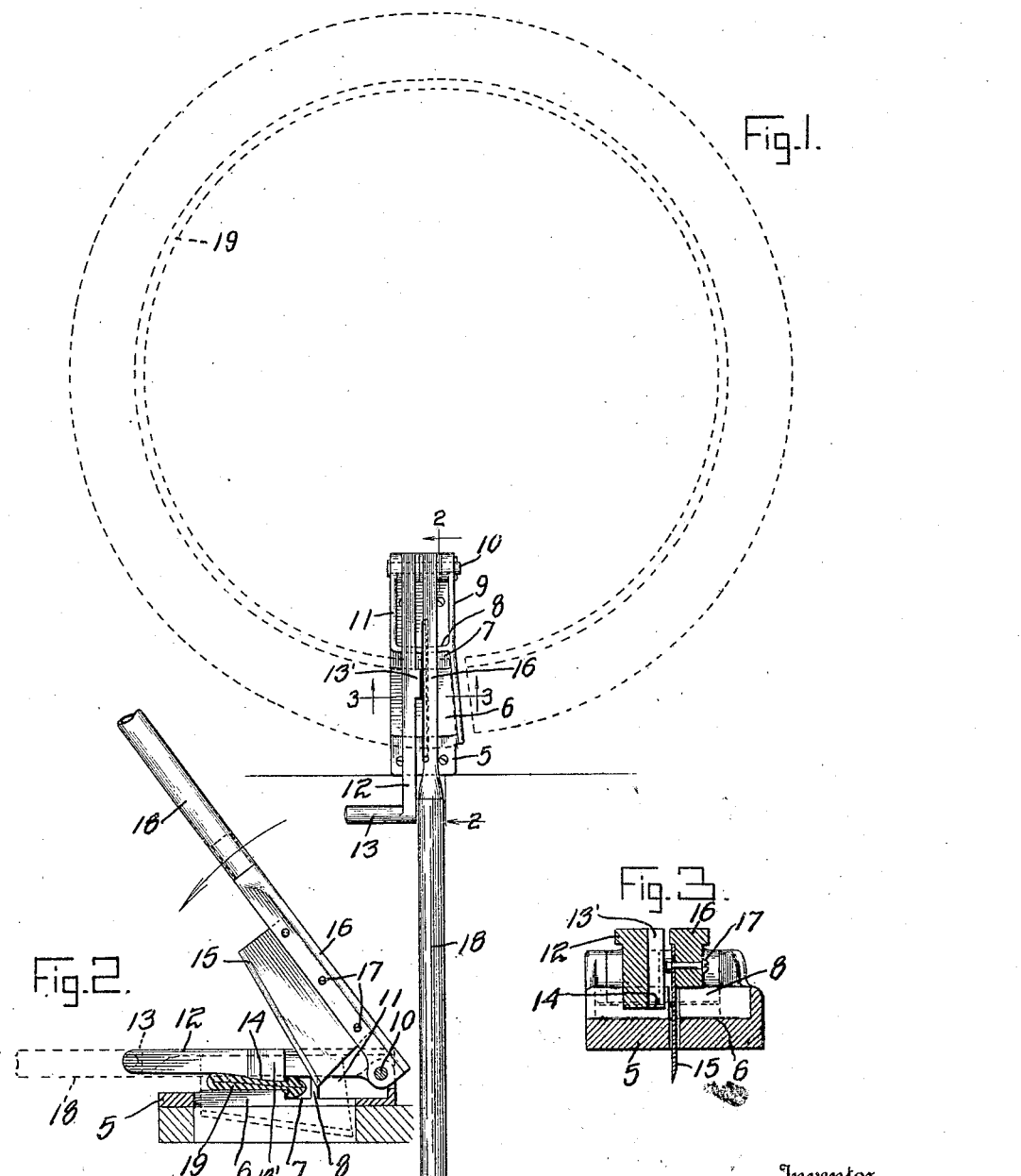
Inventor
Curt York Patented Jan. 23, 1923.

1,443,303

UNITED STATES PATENT OFFICE.

CURT YORK, OF MEMPHIS, TENNESSEE.

CUTTING DEVICE FOR PNEUMATIC TIRES.

Application filed April 27, 1921. Serial No. 464,991.

*To all whom it may concern:*

Be it known that I, CURT YORK, a citizen of the United States, residing at Memphis, in the county of Shelby and State of Tennessee, have invented certain new and useful Improvements in Cutting Devices for Pneumatic Tires, of which the following is a specification.

My said invention relates to a cutting device intended primarily for cutting up used clincher tires of automobiles, the sections being cut into lengths convenient for the making of tire armor. It is an object of my invention to provide a convenient and workable device of the character described which shall be adapted to cut the used tire into convenient equal lengths of proper form and size for the purpose specified.

Referring to the accompanying drawings which are made a part hereof and on which similar reference characters indicate similar parts, Figure 1 shows a plan of the device in working relation to a tire, Figure 2 a longitudinal section on line 2—2 of Figure 1, and Figure 3 a transverse section on line 3—3 of Figure 1.

Referring to the drawings reference character 5 indicates the base of the device which is adapted to be fastened to any convenient support by screws or other conventional fastening means. The base has a ledge 6 for supporting the main portion of the tire and a depression 7 for receiving the bead of the same. The depression is bounded at its forward end by a flange 8 extending across the base. A flange 9 extending upwardly from one side of the base has at its forward end a bearing for a pin 10 which extends also through a bearing in a flange 11 at the opposite side of the base, the latter flange extending forward only from the transverse flange 8.

The pin 10 provides a pivot for a clamping member 12 having a handle 13 and having a lateral projection 13' and an inclined lower edge at 14. A cutting device supported on pin 10 comprises a knife 15 having its edge inclined from the wide front portion toward the narrower rear portion. This knife is supported by a back 16 pivoted on pin 10 and to which the knife may be attached by bolts 17 or in any other convenient manner. An extension 18 in the form of a pipe is threaded to the rear end of back 16 and may be removed for convenience in shipping or storing the device.

In the operation of the device a used tire, indicated in dotted lines at 19, is first cut through radially either by the use of my device or in any other manner and is then placed on the base, as shown in Figure 2, with the cut edges against the inclined rear portion of the flange 9. The clamp 12 is then brought down to hold the tire in place, one bead of the tire resting in the depression 7 and the other being received in a similar depression on the clamp. The clamp being firmly held down the lever 18 is now operated to bring the knife into operation and this will cut through the tire from front to rear of the implement with a shear action. The operation is then repeated and when a sufficient number of lengths have been cut they are joined together by wires or otherwise into an armor of sufficient length to extend about a tire of an automobile or like vehicle.

Having thus fully described my said invention, what I claim as new and desire to secure by Letters Patent, is:

1. A cutting implement for pneumatic tires comprising a base, a clamping member pivoted thereon, said base and said clamping member having corresponding ledges for holding the thinner portion of the tire and corresponding depressions for the beads and a cutting device also pivoted on the base, substantially as set forth.

2. A cutting device for automobile tires comprising a base, means connected thereto for clamping the tire on the base, said base and said means having corresponding depressions to receive the beads of the tire, and a cutting member adjacent the clamping means, substantially as set forth.

3. A cutting implement for pneumatic tires comprising a base having a longitudinal slot therein and a groove extending transversely of the slot, a ledge adjacent the groove, and means for clamping a tire on the base with the bead of the tire in the groove and the cutting device arranged to operate in said slot with a shear action, substantially as set forth.

4. In a cutting implement for pneumatic tires, a base having a longitudinal slot, means for clamping the tire in position across said slot and a pivoted cutting device operating in said slot and including a blade inclined from front to rear whereby the front portion of the blade enters the slot in advance of the rear portion, substantially as set forth.

5. A cutting device for pneumatic tires comprising a base having a longitudinal slot, a pivot at the front of the base, a clamping member and a cutting member on said pivot, said cutting member including a back and a removable handle extending rearwardly therefrom in alignment with the back, substantially as set forth.

6. A cutting implement for pneumatic tires comprising a longitudinally slotted base, a longitudinal flange at one side of the base inclined to the slot to act as a gauge for the tire and cutting means adapted to operate through the slot, substantially as set forth.

In witness whereof, I have hereunto set my hand and seal at Memphis, Tennessee, this 25th day of April, A. D. nineteen hundred and twenty-one.

CURT YORK. [L. S.]

Witnesses:
JOHN W. FARLEY,
F. M. BAILEY.